United States Patent

[11] 3,627,333

[72] Inventor  Donald C. Hill
                Concord Township, St. Louis County, Mo.
[21] Appl. No. 5,054
[22] Filed     Jan. 22, 1970
[45] Patented  Dec. 14, 1971
[73] Assignee  Eaton Yale & Towne, Inc.
                Cleveland, Ohio

[54] PISTON RING
    4 Claims, 8 Drawing Figs.
[52] U.S. Cl. .................................................. 277/139
[51] Int. Cl. ................................................... F16j 9/06
[50] Field of Search .......................................... 277/138,
                                                    139, 140, 160

[56]             References Cited
              UNITED STATES PATENTS
2,670,256  2/1954  Hsia-si Pien .................. 277/139
3,300,224  1/1967  Games .......................... 277/139
3,056,607  10/1962 Knoebel ........................ 277/160

Primary Examiner—Robert I. Smith
Attorney—Teagno & Toddy

ABSTRACT: Multiple-piece piston rings for internal-combustion engines in which the cylinder-engaging ring members are biased outwardly by a circumferentially compressible noncylinder-engaging spacer-expander, which is notched in an off-radial direction to minimize the likelihood that the gap-ends of the cylinder-engaging members may hang on parts of the spacer-expander member, and wherein the surfaces which transmit radial thrust extend in a substantially off-axial direction to wedge the cylinder-engaging rings axially apart into so-called "side-sealing" relationship with the sides of a ring groove.

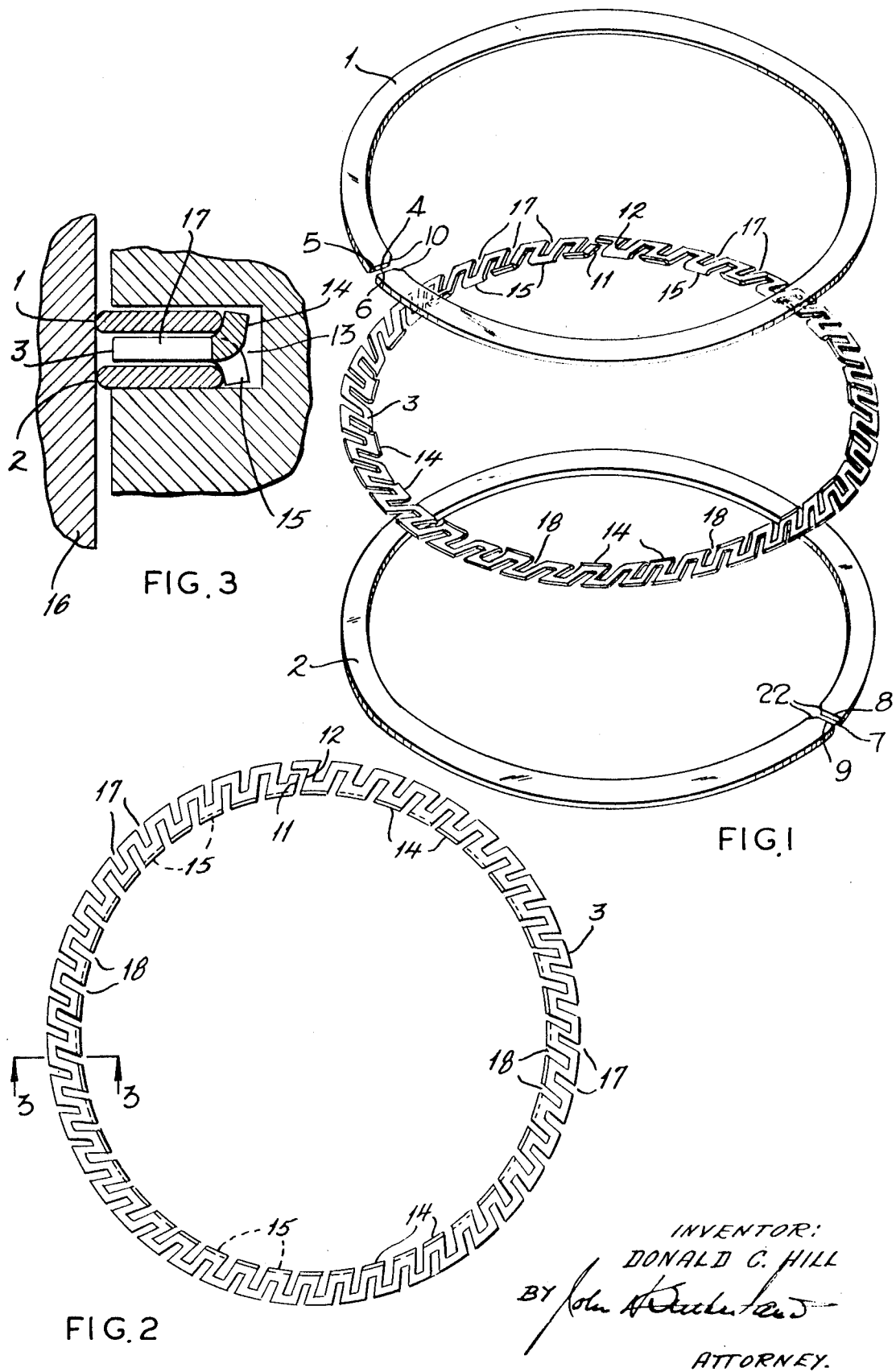

PATENTED DEC 14 1971 3,627,333

INVENTOR:
DONALD C. HILL
BY
ATTORNEY.

PISTON RING

This invention relates to piston rings for internal combustion engines, and particularly to ring combinations of the general type represented by U.S. Pat. Nos. 2,670,256 and 3,056,607. Such ring combinations involve two so-called "rails" (usually made from ribbon steel about 0.025 to 0.050-inch thick and about 0.125 to 0.25-inch wide) spaced apart by a ribbon steel "expander" ring which runs free of the cylinder wall, but exerts a thrust on the rails urging at least one of them radially outward into engagement with the cylinder wall. They look good on paper, but have failed to gain the hoped for degree of commercial acceptance. The explanation for such failure may be debated, but I have discovered what I consider to be an underlying cause of it, to wit: that such structures have an inherent tendency for their individual elements to "hang-up" on each other during the process of installing them in a cylinder. "Hang-ups" at the time of installation are not easy to detect and usually go unnoticed at the time, but the damage done by such "hang-ups" is not only permanent, but conducive to cylinder scuffing and other malperformance of the engine, and damage them or interfere with the intended functioning of them.

It is therefore the primary object of the invention to eliminate, or at least alleviate, the tendency for the components of such rings to "hang-up."

Another object is to provide such a ring set with a spacer-expander element that is incompressible in the axial direction, but nonetheless resiliently urges the cylinder-engaging rings above and below it into sealing engagement with the opposite sides of the groove in which the ring set is mounted.

Different types of "hang-up" are involved. One type is the result of buckling in the spacer-expander and/or in the so-called "rails" while being contracted to permit insertion into a cylinder. Such buckling takes the form of waviness with axially extending ups and downs, and may throw one gap-end of a rail sufficiently toward the spacer-expander that one or the other will tend to dig into or foul against irregularities in the other. Another type of "hang-up" is a consequence of dish in one or both of the "rails" or "segments" which are the cylinder-engaging members of such a ring combination, and may manifest itself at either peripheral edge of the rail depending upon the sense of the dish in the respective rails—which may mean that the sense of the dish in one rail is opposite that in the other rail. A third type of "hang-up" occurs at, and only at, the peripheral edge of a rail against which the radial thrust of the expander element is applied—which peripheral edge is commonly the inner periphery of a rail, but, in the case illustrated in FIGS. 5 and 7 of U.S. Pat. No. 3,056,607, may be the inner periphery of the cylinder-engaging rail but the outer periphery of the noncylinder-engaging rail. A fourth type of "hang-up" occurs when the ring combination is used in a cylinder which is tapered, e.g., worn to a different diameter at one end than at the other end or at the middle, thus requiring that the diameter of the rails undergoes an extraordinary degree of change during each stroke of the piston, and consequently that the operating gap is repeatedly lengthening and shortening with the possibility of fouling against a notch in, protuberance on, or end of the expander.

The invention contemplates eliminating, or at least minimizing, the first- and second-mentioned types of "hang-up" by the feature of running the notches, in the noncylinder-engaging spacer-expander, in a substantially off-radial direction; eliminating the third-mentioned type of "hang-up" by the feature of off-radially chamfering the gap-ends of the rails at the periphery thereof which is in thrust-transmitting relationship with the expander; and eliminating the fourth type by the combination of both said features.

One complete embodiment of the invention, as well as some alternatives, are illustrated in the accompanying drawings, in which:

FIG. 1 is an exploded view in perspective of the elements forming such a multipiece ring having its cylinder-engaging elements in the form of two steel rails;

FIG. 2 is a plan view of a spacer-expander element suitable for use in the ring combination of the invention;

FIG. 3 is an axial sectional view taken at any of a vast number of radii, such as that indicated by the arrows 3—3 in FIG. 2, through a typical cylinder wall surrounding a piston having one groove equipped with a ring combination shown in FIG. 1;

Figure 4:
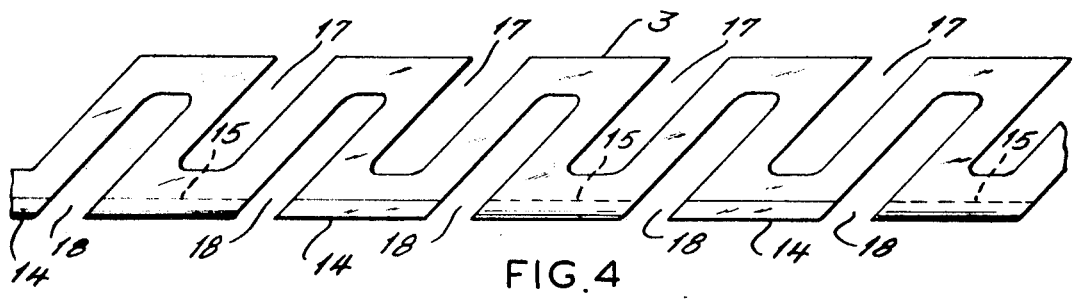
FIG. 4 is a fragmentary plan view, on enlarged scale, of a strip or band of spring metal from which the spacer-expander element shown in FIGS. 12 and 30 can be made, showing it at a stage of manufacture after it has been notched and flanged but before it has been curled into circular form.

In the form shown in FIG. 1, the composite ring consists of a pair of conventional steel rails 1 and 2, which are the cylinder-engaging elements of the ring combination, intervened by a nonbottoming, noncylinder-engaging spacer-expander element 3. As is well understood by those skilled in the art, the spacer-expander 3 can be made of stainless steel, carbon spring steel, or other material having appropriate strength and elasticity. The rail 1 has a gap 4 bounded by a gap-end 5 and a gap-end 6 which are substantially radial. Likewise, the steel rail 2 has a gap 7 bounded by a gap-end 8 and an opposite gap-end 9.

The corner between the inner periphery of ring 1 and gap-end 5 is chamfered at an angle of approximately 45° relative to the plane of gap-end 5, as shown at 10. A comparable chamfer is also provided at the intersection of gap-end 6 with the inner periphery of rail 1, as well as at the intersections of gap-ends 8 and 9 with the inner periphery of rail 2, and reference to the chamfer 10 hereinafter will be understood to apply to any one of those just mentioned unless expressly stated otherwise.

The spacer-expander element 3 serves not only to space apart, and to impart an axial thrust to, the cylinder-engaging rails 1 and 2, thereby urging the rails into so-called "side-sealing" relationship with the groove sides, but also applies to each of them a radial thrust tending to urge the rails into sealing engagement with the wall of the cylinder in the ring combination is to operate. The spacer-expander 3 has opposite ends 11 and 12, which are intended to abut each other when the ring combination is disposed in a piston ring groove 13, and installed in operating relationship within a cylinder, and in the embodiment shown in FIGS. 1, 2 and 4, the end 11 is formed as a finger to internest with a mating formation of end 12. The rails 1 and 2, or other appropriate cylinder sealing rings, are installed above and below the spacer-expander with the inner periphery of rail 1 in engagement with upturned tabs 14 of the spacer-expander 3, and the inner periphery of rail 2 in engagement with downturned tabs 15 of the spacer-expander. As most clearly shown in FIG. 3, the tabs 14 and 15 are respectively disposed at an obtuse angle, e.g., about 95 to 105° relative to the upper and lower faces of the spacer-expander 3, and thus the radially outward thrust imparted to the respective rails tends simultaneously to wedge the rails apart and into sealing engagement with the sidewalls of the groove 13. As most clearly shown in FIG. 6, all sections of spacer-expander 3 which have upturned tabs 14 alternate with sections having downturned tabs 15 for radial thrust-transmitting engagement with the inner periphery of the cylinder-engaging rings above and below, respectively. When assembled in a piston ring groove (and before the piston is installed within a cylinder such as 16—that is to say, before the rails 1 and 2 are contracted to cylinder diameter), the gap between ends 11 and 12 of the spacer-expander is intended to be closed, that is to say, end 11 abuts end 12 with no gap, and hence the resilience of the spacer-expander depends in part upon its circumferential contractability and elasticity. Thereafter, when the cylinder-engaging rails 1 and 2 are forcibly contracted (by reducing their free gap) to cylinder diameter (or less in order to insert the piston and rings into the cylinder) the spacer-expander is circumferentially compressed so as to have a lesser periphery than when the ends 11 and 12 abut each other without forcible circumferential contraction of the ring assembly. Such circumferential contractibility is provided by notching the member 3 from the outer periphery inwardly as at 17, as well as from the inner periphery outwardly as at 18, alternately. Heretofore such notching of a spacer-expander has been done in a manner such that the centerline of each notch laid substantially on a radius of the assembled ring combination, but the present invention contemplates that such notches be made with their center lines extending substantially off-radial, as, e.g. 45° off-radial, as shown in FIGS. 1, 2 and 4.

By providing the notching in form last described, no such notch is ever parallel with a rail's radially extending gap-end 5 or 6, or 8 or 9, when any one of said rails' gap-ends is in circumferential orientation relative to a given notch 17 or 18 such that either is near the other. Consequently, each of the rails' gap-ends 5, 6, 8 or 9 is free to move circumferentially relative to the spacer-expander 3, and each rail is free to move independently of the movement of the other, or of the spacer-expander, relative to the walls of the piston ring groove in which the ring combination is installed. Some such relative movement is inherent in the operation of installing a piston equipped with such rings into the cylinder of an internal-combustion engine, and is also inherent during operation in a tapered cylinder. In the constructions heretofore provided, the possibility for fouling such relative movement has existed at every tab, such as 14 or 15, when either the gap 4 or the gap 7 was adjacent it; and when the tab formation and notching are done as disclosed in the aforesaid U.S. Pat. No. 2,670,256, the propensity for fouling the desirable relative circumferential movement also prevails at the outer periphery of the spacer-expander when a rail is buckled or in a posture of dish. The outer upper corner of either gap-end 8 or 9, or both, could interlock with the edges of any notch 17 if such notch had its edges extending radially as the gap-ends 5, 6, 8 and 9 do, or otherwise substantially parallel with the gap-end in reasonable proximity with the given notch. With periphery arrangement shown in FIG. 4, however, the gap-ends 5, 6, 8 and 9 always assume an orientation which is disaligned with the notching. Accordingly, when, in the course of installation or operation in a tapered cylinder or other relative circumferential movement, a radial gap-end 5 of rail 1 approaches (in the direction toward the reader of FIG. 6) a corner such as 19 between the off-radial edge 20 of a notch 17 and the outer periphery of the spacer-expander 3, the gap-end and the notch edge will be decidedly out of parallel relationship, so that some increment of the gap-end 5 will always be sufficiently supported by some increment of the opposite edge of the same notch that the two cannot collide as one moves toward the other. The same type of anticollision prevention occurs in the reverse relation when the gap-end 6, moving in the opposite direction, may eventually reach a notch and be likewise prevented from fouling against notch edge 21.

Comparable fouling of the gap-ends of the rails against the corners of the notches at the inner periphery of the spacer-expander 3 is eliminated in like manner; while fouling of the rail's gap-ends against the edges of the flanges 14 and 15 is eliminated by chamfering the corner at the inner periphery of each of gap-ends 5 and 6, as shown at 10, and at the inner periphery of gap-ends 8 and 9, as shown at 22.

Figure 5:
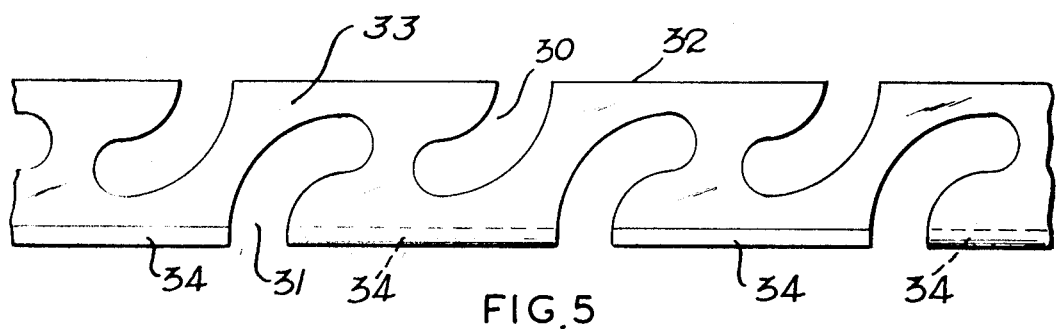
FIG. 5 is a view corresponding to FIG. 4, but showing a different embodiment.

A modified form of spacer-expander having the same advantages is shown in FIG. 5, where the desired flexibility is achieved by providing a series of arcuate notches 30, 31 in the flat of the spacer-expander. The notches 30 extend inwardly from the outer periphery 32, while the notches 31 extend outwardly from the inner periphery at positions between the upturned tabs 34 and the downturned tabs 35. Thus, the spacer-expanders of both FIG. 4 and FIG. 5, when viewed in plan as there shown, have the characteristic of circumferential sinuosity (sometimes called "corrugation"), and hence the spacer-expander element of the ring combination is referred to in some of the appended claims as a "corrugated spacer and expander spring."

Figures 6, 7, 8:
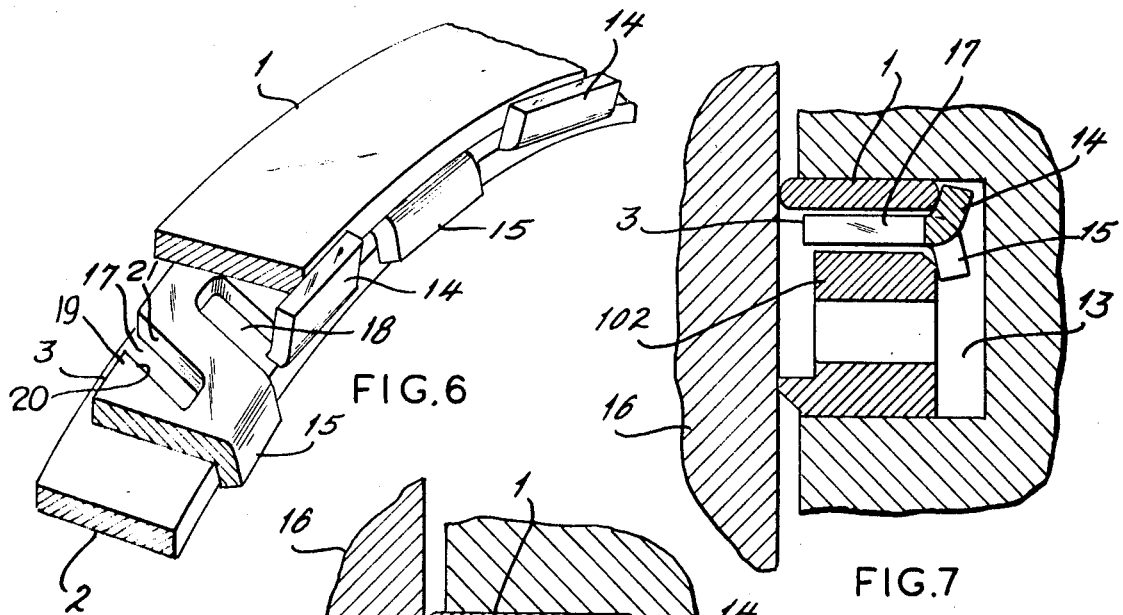
FIG. 6 is a perspective view of a sector of the parts shown in FIG. 1 in assembled relationship as contracted to cylinder diameter.
FIG. 7 is a view corresponding with FIG. 3, but showing a ring combination in which one of the steel rails is replaced by a conventional cast iron oil ring.
FIG. 8 is a view like FIG. 7, but showing a different style of oil ring.

In FIG. 7, there is shown a modification of the ring set previously described. In this modification, the cylinder-engaging steel rail 2 is replaced by a cast iron oil ring 102 of conventional type, and the groove 13 is enlarged to accommodate the three-piece ring assembly. In like manner, FIG. 8 illustrates the replacement of the steel rail 2 of FIG. 3 with a cast iron oil ring 202 of substantially lesser axial dimension than that shown in FIG. 7, which requires less enlargement of the groove 13 than does the arrangement shown in FIG. 7. In all embodiments, however, the spacer-expander 3 has off-radial notches extending alternately from the inner and outer periphery thereof, and has off-axial flanges at the inner periphery extending alternately upward and downward between the notches which open at the inner periphery.

From the foregoing description, those skilled in the art will readily understand the construction and advantages of the invention, and realize that it accomplishes the objects aforesaid. While one embodiment has been described in detail, and certain modifications thereof have been indicated, it is not to be understood that the invention is limited to the specific constructions shown in the accompanying drawings, but, on the contrary, it is realized that those skilled in the art may be expected to design equivalent structures differing in some detail or form from those herein disclosed, but nevertheless doing the same work in the same way to accomplish the same result and without departing from the spirit of this invention.

Having thus described the invention, what is claimed and desired to be secured by Letters Patent is:

1. A multipiece spring-expanded piston ring comprising a plurality of spaced-apart cylinder sealing rings, and a generally flat and generally annular intervening corrugated noncylinder-engaging spacer and expander spring intermediate said sealing rings and spacing them apart, said spacer and expander spring having one complete gap therein to form two separate abuttable ends and having its corrugations extending to-and-fro in a substantially off-radial direction and being circumferentially compressible with its free ends in abutting relation to each other, and having seal-engaging lugs at its inner periphery extending substantially off-axially therefrom into engagement, alternately, with the inner peripheries of the opposed sealing rings.

2. A generally annular spacer and expander for multipiece piston rings, comprising, a generally corrugated and circumferentially compressible body with the corrugations extending to-and-fro in a substantially off-radial direction, the inner ends of successive corrugations being formed with ring-engaging and ring-expanding lugs extending alternately in opposite and substantially off-axial directions substantially beyond the sides of said body.

3. A generally annular and circumferentially compressible resilient spacer and expander for multipiece rings, comprising, a generally flat-corrugated sheet of spring metal with the corrugations formed therein by spaced notches extending into it alternately from opposite edges in a substantially off-radial direction, and ring-engaging and ring-expanding lugs bent in a generally axial direction from the inner ends of said corrugations, alternately in opposite directions and substantially beyond the sides of said spacer and expander.

4. A piston ring combination having a pair of cylinder engaging rails having a free gap delineated by opposed gap-ends, a spacer-expander ring intervening the rails of said pair, said spacer-expander being notched to provide notches extending alternately from opposite edges and to provide circumferentially corrugated strip of material extending continuously from and to the end of the spacer-expander, tabs projecting axially in alternately opposite directions from the inner peripheral sectors of said corrugated strip, said notches extending in a substantially off-radial direction, and said gap-ends being chamfered at their inner peripheral corners.